(12) United States Patent
Smeulders et al.

(10) Patent No.: US 6,741,559 B1
(45) Date of Patent: May 25, 2004

(54) METHOD AND DEVICE FOR PROVIDING PRIORITY ACCESS TO A SHARED ACCESS NETWORK

(75) Inventors: Paul A. Smeulders, Ottawa (CA); Kris W. Kramer, Kanata (CA); Philip K. Edholm, Pleasanton, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/471,136

(22) Filed: Dec. 23, 1999

(51) Int. Cl.[7] ............................... H04J 3/14; H04L 1/00
(52) U.S. Cl. ...................... 370/230; 370/229; 370/412
(58) Field of Search ................................ 370/412, 413, 370/414, 419, 447, 445, 448, 229–231, 232–235, 236, 238

(56) References Cited

U.S. PATENT DOCUMENTS

| | | | | |
|---|---|---|---|---|
| 6,172,983 B1 | * | 1/2001 | Shaffer et al. | 370/446 |
| 6,198,722 B1 | * | 3/2001 | Bunch | 370/229 |
| 6,490,274 B1 | * | 12/2002 | Kim | 370/352 |
| 6,493,335 B1 | * | 12/2002 | Darcie et al. | 370/344 |

OTHER PUBLICATIONS

Cisco IOS Release 12.0(7)XE, "ISO Server Load Balancing", <http://www.cisco.com/univercd/cc/td/doc/product/software/ios120/120newft/120limit/120xe/120xe7/iosslb.htm#xtocid0>.

J. Desposito, "Voice/Data–Switch Processor Guarantees 'Availability of Service'—Features like Bandwidth Reservation and Flow Classification Pave the Way For Truly Viable Converged Networks", Electronic Design, Nov. 22, 1999, vol. 47, No. 24—Tech Insights, <http://www.el-ecdesign.com/1999/nov2299/ti/1122ti1.shtml>, p 1–7.

R. Seifert, "The Use of Carrier Sense for Congestion Control in Half–Duplex Switched LANs", Networks and Communications Consulting, Aug. 1996, pp 1–6.

Vertex Networks Inc., "Preparing Networks for Convergence", Product Brief DS108A; CoSMOS DS108A 9–Port 10/100Mpbs Ethernet Switch, Sep. 1999, pp 1–3.

"Virtual Server Scheduling Algorithms", <http://www.linux-virtualserver.org/scheduling.html>, Nov. 20, 1998, pp 1–2.

"Weighted Random Early Detection on the Cisco 12000 Series Router", <http://www1.tlc.polito.it/casetti/corsi/3liv/wred_gs.pdf>, pp 1–26.

Zarlink Semiconductor Inc., "CosMOS 5–Port 10/100 Mbps Ethernet Switch", MDS105AL, Redacted Version: reflecting information known at least as early as Dec. 22, 1999, pp 1–36.

* cited by examiner

Primary Examiner—Wellington Chin
Assistant Examiner—Raj Jain (57) ABSTRACT

An interface that provides priority access to a network is disclosed. The interface includes several ports. Preferably the ports are Ethernet compliant ports. At least one of the ports transmits high priority frames in advance of lower priority frames. High priority frames are preferably buffered. Buffered high priority frames pre-empt transmission of lower priority frames at the port. If the port is operating half duplex using CSMA/CD, transmission of high priority frames pre-empts re-transmission of lower priority frames for which a collision has been detected. Additionally, in the case of frames to be broadcast to multiple ports, buffered frames may be transmitted at varying times at the ports at which the frame is to be broadcast. The interface may further buffer frames received at each port. As the buffer fills, flow of frames into the interface is preferably limited on a per-port basis, based on the number of frames already buffered for a particular port. The interface is particularly well suited for providing priority access to a shared access network to a high priority appliance such as an Ethernet phone. As such the interface may be integrated with such a phone.

19 Claims, 5 Drawing Sheets

METHOD AND DEVICE FOR PROVIDING PRIORITY ACCESS TO A SHARED ACCESS NETWORK

FIELD OF THE INVENTION

The present invention relates to computer networks, and more particularly to a method and device for providing priority access to a shared access network such as an Ethernet network, preferably using a multi-port interface.

BACKGROUND OF THE INVENTION

Ethernet is a widely-installed local area network technology. Ethernet uses carrier sense, multiple access, collision detect ("CSMA/CD") to provide shared access to a physical network by many interconnected devices. As is understood by those of ordinary skill, an Ethernet compliant device using CSMA/CD shares the physical resource by first detecting or sensing the presence or absence of transmission signals originating with other competing network devices ("carrier sense"). While such transmission signals are detected, the device refrains from transmitting its own data, usually in the form of a frame. Upon detecting that a competing device has completed its current transmission, the device transmits its own data. In the presence of a collision between data from the device and a competing device, the transmitting device re-transmits its frame after a random delay ("collision detect"). This is attempted multiple times, until finally the frame is successfully transmitted without collision or discarded. Accordingly, in the face of wide competition from several devices, data transmission time from a device may be subject to significant and often unpredictable delay or even loss.

This is not a problem where real-time performance is not critical. However, in recent years, new network connected appliances are being proposed whose main applications are highly time-sensitive. One example of such an appliance is a telephone.

As is appreciated, delay in an audio conversation is annoying and unacceptable. On a shared network, frames containing audio data may be delayed or may experience multiple collisions with other frames until ultimately an unusable telephone connection results.

One network enhancement that addresses congestion uses bridges or switches to effectively divide a network into two or more sub-networks. Such bridges or switches examine frame destination addresses (typically by examining Ethernet media access control ("MAC") addresses) and prevent frames not destined for a sub-network from propagating on the sub network, thereby reducing sub-network traffic and collisions.

Optimally, bridges or switches should be used with a separate physical connection coupling a high priority appliance to a bridge or switch. This is clearly inconvenient. Moreover, the installation of additional Ethernet bridges or switches may involve substantial expense.

Most existing networks provide each user with only a single Ethernet cable to the user's desktop, which is typically in use by the user's PC. Therefore, installing a high priority network appliance such as a telephone on this existing Ethernet cable is very attractive. Bridges or switches may divide the network into several sub-networks. However, even on such sub-networks collisions are likely to occur between high priority appliance data and low priority PC data. Typically, PC applications are not as time critical as real-time audio processing applications used in telephony. Moreover, the protocols used for PC applications are tolerant to delayed and lost frames of data. Audio processing applications may not be and, therefore, priority-based access to network bandwidth, favouring the telephone, is preferred.

Existing Ethernet switches, as for example available from Vertex Networks of Irvine, Calif. allow priority access to a network by way of a high priority port. However, such existing switches do not provide efficient flow control, and cannot provide priority during re-transmission of low priority frames in accordance with existing Ethernet protocols.

Accordingly, improved methods and interfaces providing prioritized access to a shared access data network is desired.

SUMMARY OF THE INVENTION

In accordance with the present invention, an interface provides priority access to a network. At least one port of the interface transmits high priority frames in advance of lower priority frames. High priority frames are preferably buffered. In accordance with one aspect, buffered high priority frames, pre-empt transmission of low priority frames at the port. If the port is operating half duplex using CSMA/CD, transmission of high priority frames pre-empts re-transmission of lower priority frames for which a collision has been detected. Additionally, in the case of frames to be broadcast to multiple ports, buffered frames may be transmitted at varying times at the ports at which the frame is to be broadcast.

In a further aspect, a multi-port interface buffers frames received at each port. As the buffer fills, flow of frames into the interface is limited on a per-port basis, based on the number of frames already buffered for a particular port.

In a further embodiment, old buffered high priority frames may be discarded at an interface in favour of newer high priority frames. This may be particularly useful in the case of buffer overflow, when flow from an interconnected appliance cannot be controlled.

In accordance with an aspect of the present invention there is provided a network interface including a high priority port for interconnecting the interface to a high priority network appliance; a lower priority port for interconnecting the interface to a lower priority network appliance; a network port for connecting the interface to a data network; and a buffer in communication with the high lower and network ports, to buffer frames from the high priority port until these frames are transmitted. The device is operable to receive frames at the high priority port and the lower priority port and to transmit frames from the high priority port at the network port in advance of frames from the lower priority port. Any buffered frames from the high priority port for the network port, pre-empt transmission of frames from the low priority port at the network port.

In accordance with another aspect, a network interface includes first, second and third network ports; a controller in communication with these ports; and buffer memory in communication with the controller. The controller is adapted to transfer frames between the first, second and third ports by way of the buffer memory. The controller is further adapted to order transmission of frames at these ports so that any frames from the first port to be transmitted at both the second and the third port, may be transmitted at different times at the second and third port.

In accordance with yet another aspect, a network interface includes first, second and third network ports; a controller in communication with these ports; and buffer memory in communication with the controller. The controller is adapted to receive frames from these ports and buffer these frames within the buffer memory, until these frames are transmitted from the interface; and prioritize frames received at the interface so that frames received at the first port are transmitted in advance of frames received at the second and third port at at least one of the second and third ports. The controller further limits flow from each of the first, second, and third ports, independently, in response to the number of frames already buffered at the interface from the first, second and third ports.

In accordance with another aspect, a method of transmitting high priority frames-and lower priority frames from a network port at an interface using carrier sense multiple access, collision detect ("CSMA/CD") to transmit the frames, the method includes: (a) transmitting lower priority and higher priority frames from the port using CSMA/CD with high priority frames transmitted in advance of lower priority frames; and (b) in the presence of a detected collision at the port pre-empting re-transmission of a lower priority frame in favour of any high priority frames to be transmitted from the interface.

In accordance with another aspect, a network interface includes: a high priority port for connection to a network appliance; at least one other port; a controller in communication with these ports; and buffer memory in communication with the controller. The controller is adapted to receive frames from the high priority port, buffer the received frames within the buffer memory, and transmit the received frames at another port of the interface. Each of the received frames is buffered until no longer required at the interface. Incoming frames from the high priority port may be buffered to replace older received frames from the high priority port so that older frames are discarded in advance of newer frames at the interface, in the event of a buffer overflow.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Figure 1:
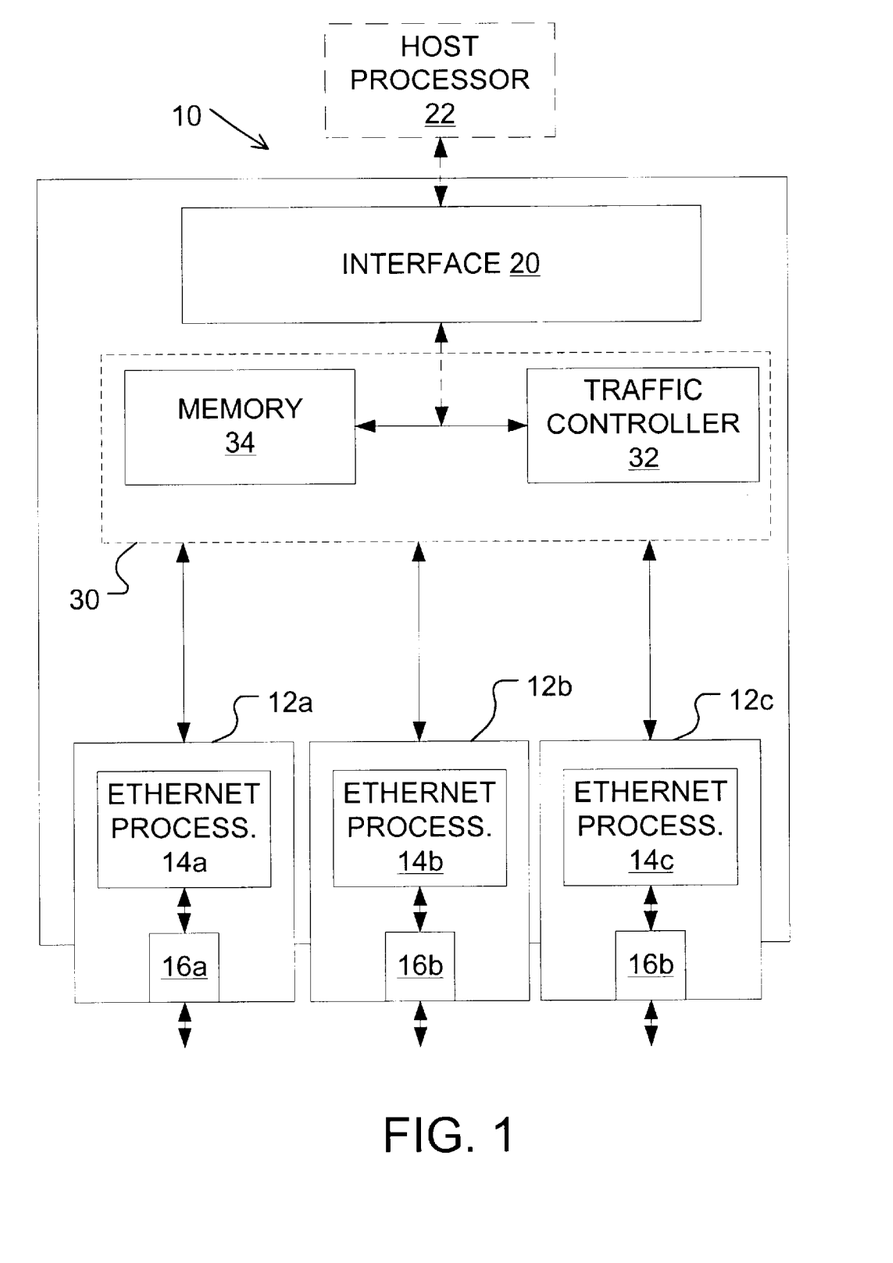
FIG. 1 is a simplified block diagram of a network interface, exemplary of an embodiment of the present invention.

FIG. 1 illustrates a network interface 10 capable of splitting high priority traffic and low priority traffic received on a single physical network port among two ports, in a manner exemplary of the present invention. Network interface 10 is similarly capable of prioritising traffic to be passed to a network and received at the two ports, in dependence upon the port from which the traffic originates.

As illustrated, interface 10 preferably includes first, second and third physical ports 12a, 12b, and 12c (collectively ports 12). Each physical port preferably includes an Ethernet 10baseT/100baseTx connector 16a, 16b and 16c (collectively connectors 16) each in communication with an Ethernet processor 14a, 14b and 14b (collectively Ethernet processors 14), respectively.

As understood by those of ordinary skill, 10baseT/100baseTx connectors typically include transmit and receive pairs. Using CSMA/CD, the receive pair of a 10baseT/100baseTx connector may be sensed for traffic; if a signal is present on the receive pair, data is not transmitted. If a signal is present on the receive pair, while data is being transmitted, a collision is detected. So operated Ethernet interfaces using CSMA/CD and 10baseT/100baseTx connectors are said to operate in half-duplex, at one time being able only to transmit or receive. Recent enhancements to the traditional Ethernet IEEE 802.3 standard, also allow conventional Ethernet interfaces using 10baseT/100baseTx connectors to operate in full duplex mode. Operation in full duplex mode is only possible by disabling CSMA/CD. However, full duplex operation typically requires dedicated (ie. non-shared) links between an Ethernet interface, so operating, and a switch or another interface. As will be appreciated, many Ethernet interfaces support both full and half-duplex communication. The mode any interface is using may be manually configured or auto-negotiated. Full duplex Ethernet operation and auto-negotiation are more completely described in Seifer, R., GIGABIT ETHERNET, 1998 Addison Wesley, the contents of which are hereby incorporated by reference.

Thus, Ethernet processors 14 are preferably general purpose Ethernet processors, compliant with the current IEEE 802. 3 standard, but modified slightly, in a manner exemplary of the present invention, as detailed herein. As such, Ethernet processors 14 preferably support full-duplex, and half-duplex operation, as well as auto-negotiation. As will become apparent, however, an interface including Ethernet processors providing a subset of these feature and/or other physical connectors, such as a coaxial or optical cable connector could be used as part of similar embodiments of the invention.

A general purpose processing element 30 is in communication with processors 14. Processing element 30 includes a controller 32 acting as a traffic controller, and memory 34. Processing element 30 routes traffic between Ethernet processors 14 and thus ports 12. Processing element 30 may pass data to any of processors 14 using a bus, direct memory access or any other techniques known to those of ordinary skill in the art. Preferably, controller 32 is a programmable controller that is pre-programmed during the assembly and formation of interface 10, to cause interface 10 to act in manners exemplary of the present invention. As such, controller 32 may include programmable NVRAM, EEPROM or other suitable memory (all not shown) for storing program instructions adapting controller 32 to act accordingly. Memory 34 is preferably random access memory that may be used by controller 32 to buffer frames of data to be routed between ports 12. Specifically, memory 34 preferably includes at least 16,384 bytes of RAM, capable of buffering at least six Ethernet frames and associated control and management data. Most preferably more RAM will be used. As will become apparent, the more RAM that is used the less likely memory 34 will overflow.

Each of ports 12 is preferably not associated with its own Ethernet MAC address. Instead, ports 12 under control of processor 14 repeat Ethernet frames and MAC addresses of interconnected appliances originating the frames, in much the same manner as ports of an Ethernet switch repeat frames.

Optionally, interface 10 further includes a host interface 20 to an external host processor 22, useable to reprogram controller to configure or query the operation of interface 10, as detailed below. As will be appreciated by those of ordinary skill in the art, the components of interface 10 may be integrated to various degrees. Indeed, a single physical device may be designed to incorporate all of the components of interface 10.

Now, controller 32 is pre-programmed to treat one of ports 12 as a data network ingress/egress port for interconnection with an external network. For simplicity port 12a may be considered as this network port. As well, port 12c is treated as a high priority appliance port, while port 12b is treated as a lower priority appliance port. Which of ports 12a, 12b and 12c is treated as network, high and lower priority port may be configured at interface 10, for example manually or through host interface 20.

Generally, interface 10 receives data in the form of Ethernet frames from ports 12b and 12c and assumes responsibility for ensuring these are passed to any network interconnected with port 12a. Moreover, controller 32 passes frames from ports 12b and 12c to network port 12a, in priority. Frames originating with a network appliance interconnected with high priority port 12c are preferably passed to any network interconnected with network port 12a, in advance of frames originating with an appliance interconnected with lower priority port 12b.

Figure 2:
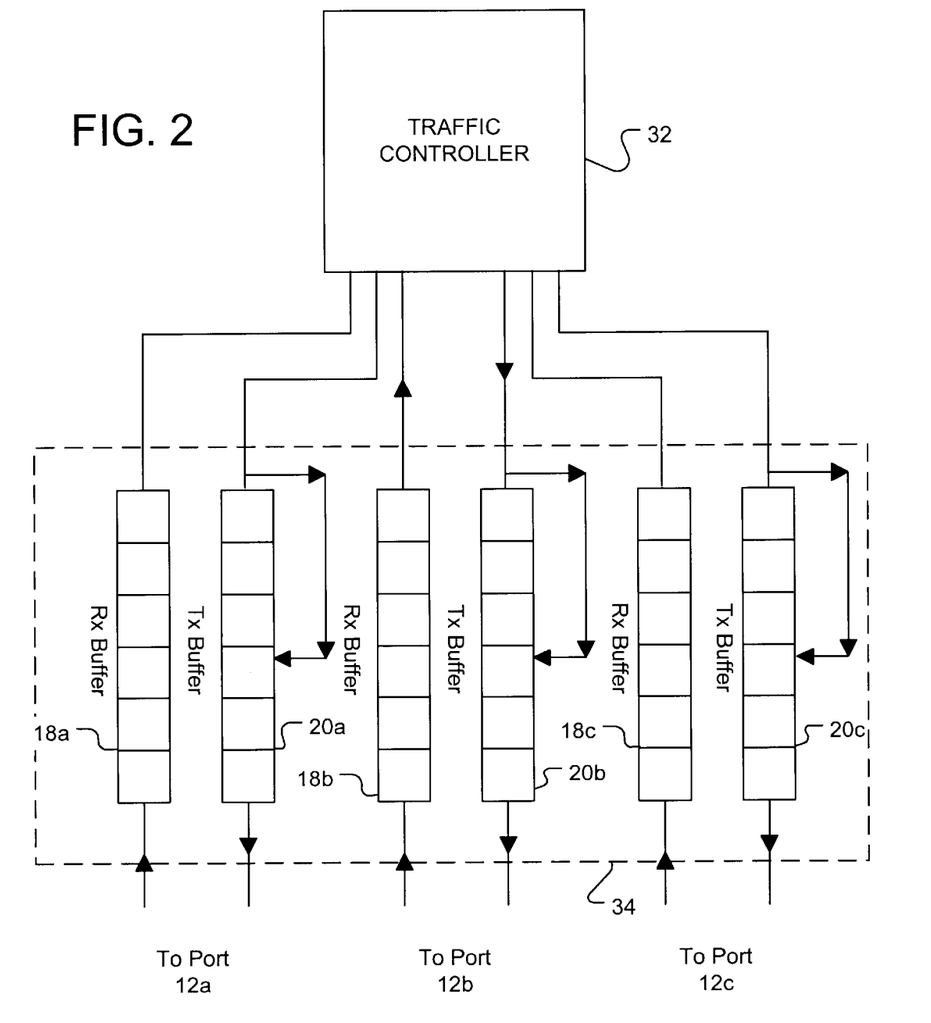
FIG. 2 is a simplified block diagram illustrating exemplary buffers formed in the device of FIG. 1.

In order to facilitate the priority delivery of frames, processor 30 preferably forms a plurality of buffers within memory 34, as illustrated in FIG. 2. Specifically, processor 30 preferably forms buffers pairs 18a, 20a, 18b, 20b, and 18c, 20c, each pair associated with a port 12a, 12b and 12c, respectively. Buffers 18a, 18b, 18c, (collectively buffers 18) and 20a, 20b and 20c (collectively buffers 20) are conventional data structures within memory 34; may be of variable size; and may be formed in any of a number of known ways. Buffers 18 and 20 may be formed and re-sized as required. Each of buffers 18 associated with one of ports 12 is a receive buffer, used to buffer data received an associated one of ports 12 from an associated connector 16 and interconnected network appliance or network. The other buffers 20 are each transmit buffers used to buffer frames before these are passed to an associated port 12 and interconnected port or appliance. Processor 30 allows frames to be passed between buffers, and hence ports, with preferred priorities. Processor 30 may transfer frames between buffers 18 and 20 or alternatively may use pointers within memory 34 to effectively pass these frames between the buffers using techniques understood by those of ordinary skill in the art.

Ethernet processors 14 under control of processor 30 are further adapted to maintain flow control of frames into ports 12. Specifically, if a particular port is configured to operate in half duplex, processors 14 may adapt ports 12 to generate false collisions or false carriers (or even just the pre-amble of false carriers) to limit flow into a port. Flow control techniques are, for example, detailed in "The Use of Carrier Sense for Congestion Control in Half-Duplex Switched LANs", Seifert, 1996 Networks and Communications Consulting, Los Gatos Calif., the contents of which are hereby incorporated by reference. The use of such flow control, in turn, causes interconnected CSMA/CD compliant devices to refrain from sending frames, and thereby limits flow of frames into the ports 12. Similarly, if one or more of ports 12 is configured to operate full duplex, an associated one of processors 14 may adapt the port to send a "pause" command, such as the PAUSE N command supported by the IEEE 802.3x specification. This similarly limits an interconnected, full duplex device from sending additional frames, thereby controlling flow of frames into any of ports 12, operating in full duplex. As will become apparent, flow control may be used to limit the overflow of buffers 18 and 20. For older Ethernet interfaces, full duplex flow control may not be supported. If one of ports 12 is interconnected with such an older interface it may note that the "pause" command is not available, and provide an appropriate indication to controller 32.

So, in operation, each of ports 12 receives Ethernet frames from interconnected networks or network appliances. Processor 30, ensures that these received frames are placed in an associated one of the receive buffers 18 associated with the port on which the frame was received. Next, processor 30 moves an incoming frame from a receive buffer 18a, 18b or 18c to one or more designated transmit buffers 20a, 20b or 20c.

Within transmit buffers 20, frames may be arranged so that high priority frames emanating with high priority port 12c are passed from transmit buffers to an associated Ethernet processor, and thereby passed to an interconnected appliance or network in advance of frames originating with a lower priority port 12b. Frames so arranged are then passed from transmit buffers to an Ethernet processor 14, to a port 12, and then to an interconnected appliance or network in accordance with the Ethernet protocol. This may be effected in any number of ways. For example, processor 30 may re-order frames within the transmit buffers 12a and 12b, as these are passed from receive buffer 18c so that frames originating with high priority port 12c are placed at the head of transmit buffers 12a and 12b, and transmitted in advance of frames originating at low priority port 12b or network port 12a. Alternatively, processor 30 could maintain high and low priority portions within transmit buffers 20a and 20b and ensure that frames from the low priority portions are only passed to ports 12a and 12b when the low priority portion is empty. As a further alternative, processor 30 may maintain one or more bits associated with each frame within buffers 18 or 20 identifying the frame as a high or low priority frame. So, processing element 30 causes any high priority frames within transmit buffers 20a and 20b to be transmitted or re-transmitted at low priority port 12b and at network port 12a by processors 14a and 14b, in advance of other frames to be transmitted at ports 12a and 12b. In any event, high priority frames are preferably passed from transmit buffers 20, first in, first out. Similarly low priority frames are passed from transmit buffer 20, first in, first out.

In the event a transmit buffer is full, a frame to be passed to that buffer is retained at the receive buffer until room exists in the transmit buffer. In the event a receive buffer fills above a pre-defined threshold (ie. contains more than a pre-defined number of frames), an associated port may apply back-pressure using the flow control techniques outlined above, in order to prevent a buffer from overflowing and losing frames. Alternatively, memory 34 may be dynamically shared between buffers 18 and 20, allowing any of the buffers to grow until memory 20 is filled beyond a defined threshold. At this point flow control may be applied at all ports. Additionally, and alternatively, lower priority frames within buffers 18 and 20 could be discarded in order to make room for high priority frames. Alternatively, if necessary high priority frames may be discarded as detailed below.

So that interface 10 need not learn the Ethernet addresses of interconnected appliances, frames received at the respective low and high priority ports are preferably passed to transmit buffers as follows:

high priority frames from high priority port 12c are passed to transmit buffers associated with both low priority and network ports 12a and 12b, and are thereby broadcast to lower priority appliance and the network;

low priority frames from a low priority port 12b are passed to high priority port 12c and network port 12a and frames from network port 12a, are passed to high priority port 12c and low priority port 12b.

As will be appreciated, frames not destined for interconnected appliance on any of ports 12, passed to these ports will simply be ignored by these appliances.

In an alternate configuration, interface 10 may learn the Ethernet address of an interconnected high priority appliance. This Ethernet address may, for example, be learned on initialisation. In this alternate embodiment, processor 30 may examine destination addresses of received frames, and pass only those received at low priority port 12b destined for high priority port 12c to transmit buffer 20c. Similarly, only those frames not destined for high priority port 12c need be passed to low priority port 12b. This configuration limits traffic to low priority port 12b and thereby prevents congestion on any cabling emanating from low priority port 12b resulting from traffic not destined for interconnected equipment. As such, in the event multiple devices are connected to low priority port 12b, and downstream of interface 10, these may continue to communicate as traffic is passed from network port 12a to high priority port 12c.

While frames are being passed from transmit buffers 20 to ports 12, data may also be received at these ports 12; placed in appropriate receive buffers 18; and transferred to the appropriate transmit buffers 20.

Thus, use of transmit and receive buffers allows independent transmission to any interconnected devices regardless of the state of other devices and associated ports. Interestingly, then frames that are received at one port, for broadcast at both other ports may be transmitted at these ports at different times.

When operating in half duplex, in the event of a detected collision during transmission at network port 12a, low priority port 12b, or high priority port 12c, interface 10 preferably re-transmits any frame for which a collision has occurred, in accordance with Ethernet binary exponential back-off, as detailed in IEEE 802.3. However, unlike with the conventional Ethernet protocol, processing element 30 is adapted to delay re-transmission of frames originating at a lower priority port 12b, at network port 12a in favour of frames arriving from high priority port 12c. Thus, high priority frames to be transmitted at a lower priority port 12b and arriving between re-transmission of low priority frames in accordance the Ethernet exponential back-off algorithm pre-empt re-transmission of the lower priority frames. This may be accomplished by placing high priority frames ahead of low priority frames within transmit buffers 20, and transmitting or re-transmitting low priority frames only when no high priority frames are queued within a buffer. After all high priority frames have been transmitted from transmit buffer 20, any low priority frames aborted as a result of the incoming high priority frames may be re-transmitted. These low priority frames may be transmitted or re-transmitted, in the case of additional collisions, up to the maximum number of times allowed by the Ethernet exponential back-off algorithm (preferably up to sixteen times). If transmission is unsuccessful within this maximum number of re-transmissions, the frames are discarded. Preferably each processor 14 assumes responsibility for transmitting and re-transmitting frames. As re-transmission of frames may be aborted, frames are preferably buffered within buffer 20 or possibly at processors 14 until successfully transmitted.

In the event interface 10 examines destination addresses of arriving frames, processing element 30 may further be adapted to delay re-transmission of frames from arriving at network port 12a destined for low priority port 12b in favour of frames from high priority port 12c destined for low priority port 12b.

Figure 3:
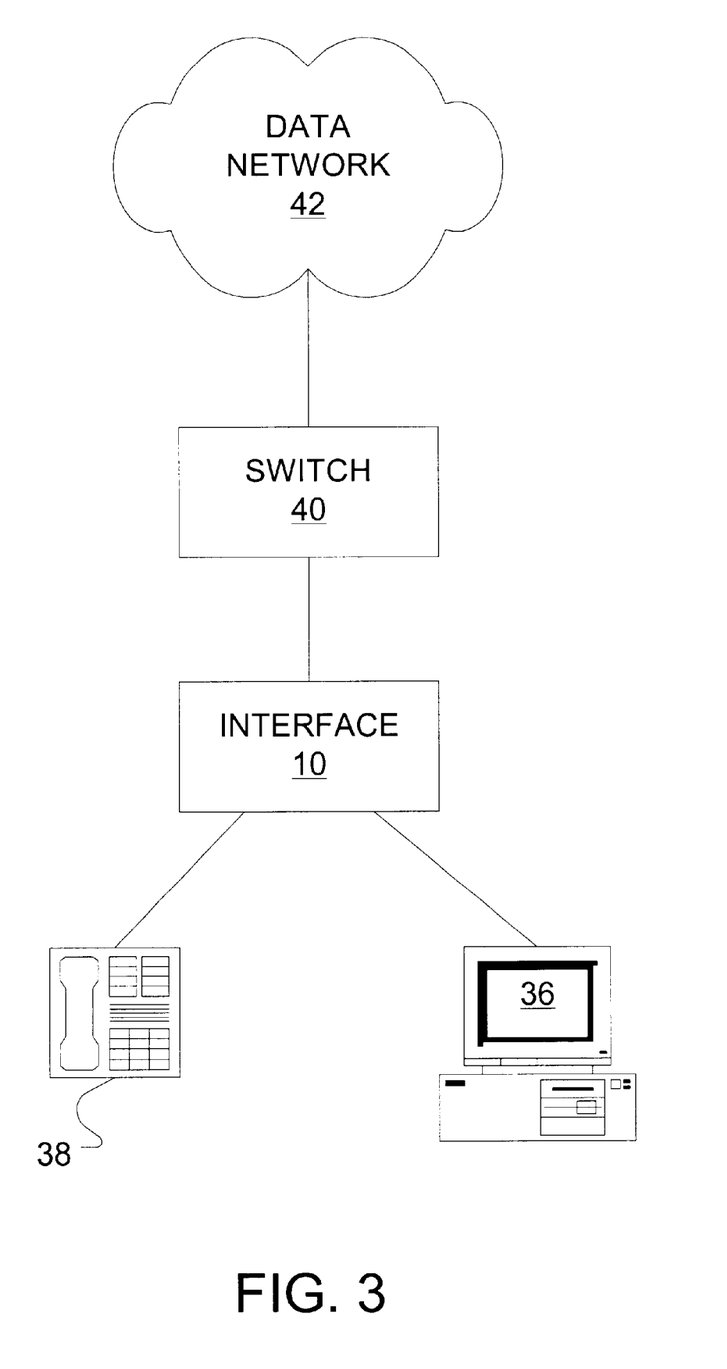
FIG. 3 illustrates a network including the network interface of FIG. 1 in a first configuration.

FIG. 3 illustrates the interconnection of interface 10 to a data network 42 and to two network appliances 36, 38. Preferably interface 10 is connected to network 42, by way of an Ethernet switch 40, as illustrated. Network 42 is preferably a conventional Ethernet data network. Ethernet switch 40 limits frames directed to interface 10 to those frames destined for devices interconnected with ports 12b and 12c. Other networks or devices (not shown) are typically also interconnected with switch 40.

Network appliance 38 is preferably a computer network telephone, such as an Ethernet phone as for example available from Nortel Networks, of Brampton, ON in association with the trademark INCA I-2004, and having a network interface, such as a conventional Ethernet interface. As will be appreciated, network appliance 38 works best when data is exchanged with it in real time, or near real time.

Network appliance 36 is preferably a conventional network aware computer such as, for example, a desktop PC preferably including an Ethernet interface; display; processor; memory storing a network aware operating system and optionally network capable software applications. Network appliance 36, in contrast to appliance 38, typically uses an additional higher level protocol, such as TCP/IP, that is more resilient to losses and delays. Network appliances 36 and 38 are therefore connected to low and high priority ports 12b and 12c (FIG. 1) of interface 10, respectively.

For reasons that will become apparent, in the interconnection of FIG. 3, CSMA/CD for low priority appliance 36 is preferably enabled, while CSMA/CD for high priority appliance 38 is preferably disabled. Appliance 38 therefore preferably operates full-duplex. Similarly, CSMA/CD at network port 12a and at high priority port 12c is preferably disabled. As noted, and consistent with the current IEEE 802.3 standard, full duplex or half-duplex may be established at each of ports 12 using auto-negotiation between interface 12 and interconnected appliances or under control of processing element 30.

Now, frames received at ports 12, are preferably buffered within their respective receive buffers 18. Processing element 30 transfers frames from the received buffers 18 to respective transmit buffers, as outlined above. Processing element 30 ensures that transmission of frames originating with high priority port 12c from interface 10 is given priority over frames originating with other ports.

In the event that any of receive buffers 18 fill, device 10 may exercise flow control limiting the further receipt of frames from interconnected appliances or network. As noted above, flow control may be exercised by transmitting PAUSE N commands for ports operating in full-duplex, or by simulating a carrier sense or collision at CSMA/CD enabled, half duplex ports. Flow into each of ports 12 may be limited independently at each port. So, in the event receive buffer 18a is filled in excess of a threshold (for example 80% of its capacity) processor 30 may direct Ethernet processor 14a to apply back pressure by originating the PAUSE N command, thereby limiting additional flow to device 10 from port 12a. The same may be done at port 12c. Similarly, in the event buffer 18b fills above a threshold, processor 30 may direct processor 14b to apply backpressure using CSMA/CD flow control techniques. Optionally, buffers 18 and 20 need not be of fixed size. Thus, for example, buffers 18 could be allow to grow as required to allow for unbalanced traffic flow at ports 12. In the event a device interconnected with high priority port 12c does not support use of the "pause" command, as determined during auto-negotiation, flow from appliance 38 cannot be stopped. So, in the event buffers 18 or 20 overflow as a result, low priority frames within buffers 20 may be over-written by high priority frames.

Once no additional room is left in buffers 20, buffered older high priority frames from appliance 38 may be over-written or discarded. Advantageously, for real-time voice communications newer high priority frames are more useful than older ones. Thus, the high priority port 12c receive buffer 18c may effectively act as a sliding window over a stream of frames originating with device 16. Frames from receive buffer 18c are of course passed to transmit buffers network 20a and 20b, as required, first in, first out. Similarly, frames within the transmit buffers are transmitted first in, first out. This eliminates the need to track "time to live" or "time in the queue" for each frame.

If transmission of a frame at CSMA/CD enabled low priority port 12b encounters a collision with a received frame from port 12b, the frame is re-transmitted by processor 26 in accordance with Ethernet exponential back-off. However, in the event any high priority frames appear within transmit buffer 20b before re-transmission of a low priority frame, the high priority frame is transmitted at port 12b in advance of re-transmitting the low priority frame from the receive buffer. Low priority frames to be transmit on port 12b are buffered in the transmit buffer until transmission high priority frames in transmit buffer 20b have been transmitted.

As appliance 38 is operating in full duplex no collisions are detected by appliance 38, as a result of received frames at interface 10. As such, subject to flow control by interface 10, appliance 38 may always transmit frames to interface 10. These will be buffered within receive buffer 18c, moved to transmit ports 20a and/or 20b, while port 12a or 12b receive frames originating with appliance 36 or network 42. Similarly, with CSMA/CD disabled, frames within transmit buffer 20c can be passed to appliance 38 without delay. Thus, communication between appliance 38 and network 42 is effectively full duplex.

Conveniently, switch 40 isolates traffic on network 42 not destined to devices interconnected with ports 12b and 12c. Moreover, the connection between switch 40 and interface 10 is preferably a four-wire connection or similar connection, with isolated receive and transmit signals. As such, port 12b is also capable of full-duplex communication with switch 40. Absent switch 40, any traffic on network 42 would cause a collision at port 12, thereby interfering with the ability of interface 10 to deliver frames to network 42.

As noted, alternatively, and optionally, destination MAC addresses of incoming Ethernet frames may be analysed at interface 10 to limit broadcast of frames to both ports 12b and 12c, in a conventional manner. Additionally, frames arriving at port 12a and/or port 12b may be designated as high and low priority frames based on their destination MAC addresses, and then placed within buffers 20a, 20b and 20c based on their priority. As will be appreciated, interface 10 could store the MAC addresses of interconnected devices. Again, these may be queried upon initialisation.

As will be appreciated, in a configuration as illustrated in FIG. 3, all ports 12 may be configured to communicate in full duplex without CSMA/CD. So configured, low priority appliance 36 may transmit frames to interface 10, while receiving frames from interface 10. Clearly, as twice as much traffic may flow into interface 10 destined for any port 12, as may flow out of any port, interface 10 will likely need to exercise flow control or lose frames, as discussed above after a short while. The duration interface 10 may operate while receiving data for one port in excess of the transmit rate for that port will depend on the size of memory 32. If memory 32, is dynamically allocated among buffers 18 and 20, flow control will first be exercised at low priority port 14b, and network priority port 14a in advance of high priority port 14c. Similarly, in the event flow is limited at all ports 14, flow control at high priority port 14c is released first.

Without switch 40, port 12a is best configured to operate in half-duplex, with CSMA/CD enabled. Interface 10 may be configured appropriately as disclosed with reference to FIG. 4. High priority port 12c preferably remains configured to operate full-duplex. Low priority port 12b may operate in either full or half-duplex. Preferably, once network port 12a is configured to operate half-duplex, low priority port 12b is also configured to operate half-duplex.

Example interface 10' is preferably integrated with an Ethernet phone, identical to appliance 38 (FIG. 3) and still includes three ports as illustrated with reference to interface 10 of FIG. 1. In this embodiment, port 12c is actually preferably a logical port. Port 12c is effectively part of the Ethernet phone, which is simply in direct communication and with direct access to processing element 30.

Again, preferably interface 10' under control of processing element 30 transmits high priority frames from any transmit buffer in advance of low priority frames within the buffer using the conventional Ethernet protocol. Similarly, as detailed with reference to FIGS. 1–3, if transmission of a low priority frame at port 12a or 12b needs to be repeated because of a collision detected at port 12a or 12b, processing element 30 may cause a high priority frame (ie. from port 12c) to pre-empt such retransmission. Once no high priority frames are buffered, re-transmission of the pre-empted frame may resume.

Although CSMA/CD is enabled at ports 12a and 12b, CSMA/CD will not significantly slow the operation of Ethernet phone, as it preferably continues to operate in full-duplex with frames buffered at interface 10. As noted, received frames are buffered within buffers 18 and 20. Advantageously, when memory 34 fills, processing element 30 may cause incoming frames for low priority devices to be discarded, making more room for frames for the high priority device. Alternatively, interface 10' may discard receive or transmit frames that have been queued in excess of a threshold time. Again, for time sensitive frames, older frames for the high priority device are discarded from buffer memory 34 in advance of newer frames. In fact, such frames may be discarded after a pre-set delay notwithstanding the state of buffer memory 34. As will be appreciated, the time each frame is buffered within memory 34 may be maintained within memory 34. Moreover, interface 10' may apply back-pressure to any of ports 12a, 12b, or 12c, using the outlined flow control techniques.

Figure 4:
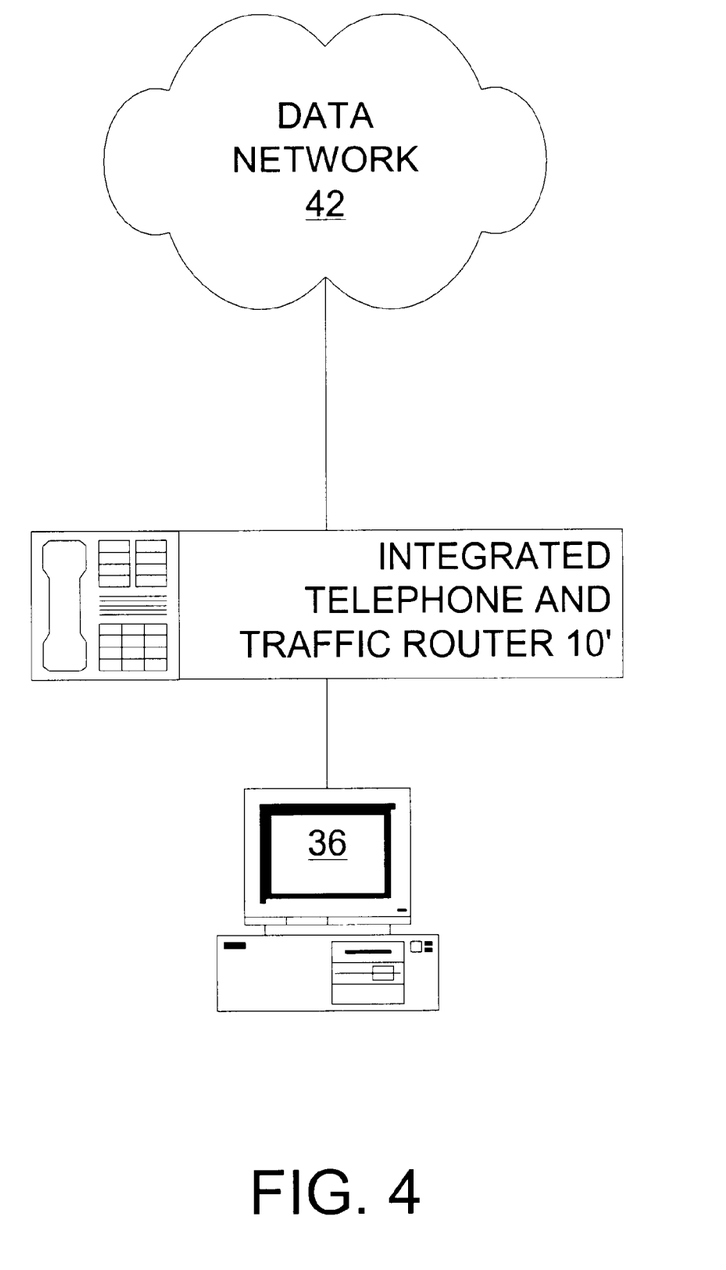
FIG. 4 illustrates a second network including the network interface of FIG. 1 in a second configuration.

Alternatively, in the configuration of FIG. 4, low priority port 12b and appliance 36 may also be configured to operate full duplex. Thus full-duplex communication could be established between the integrated Ethernet phone and device 36, without being subject to collisions at network 42.

Figure 5:
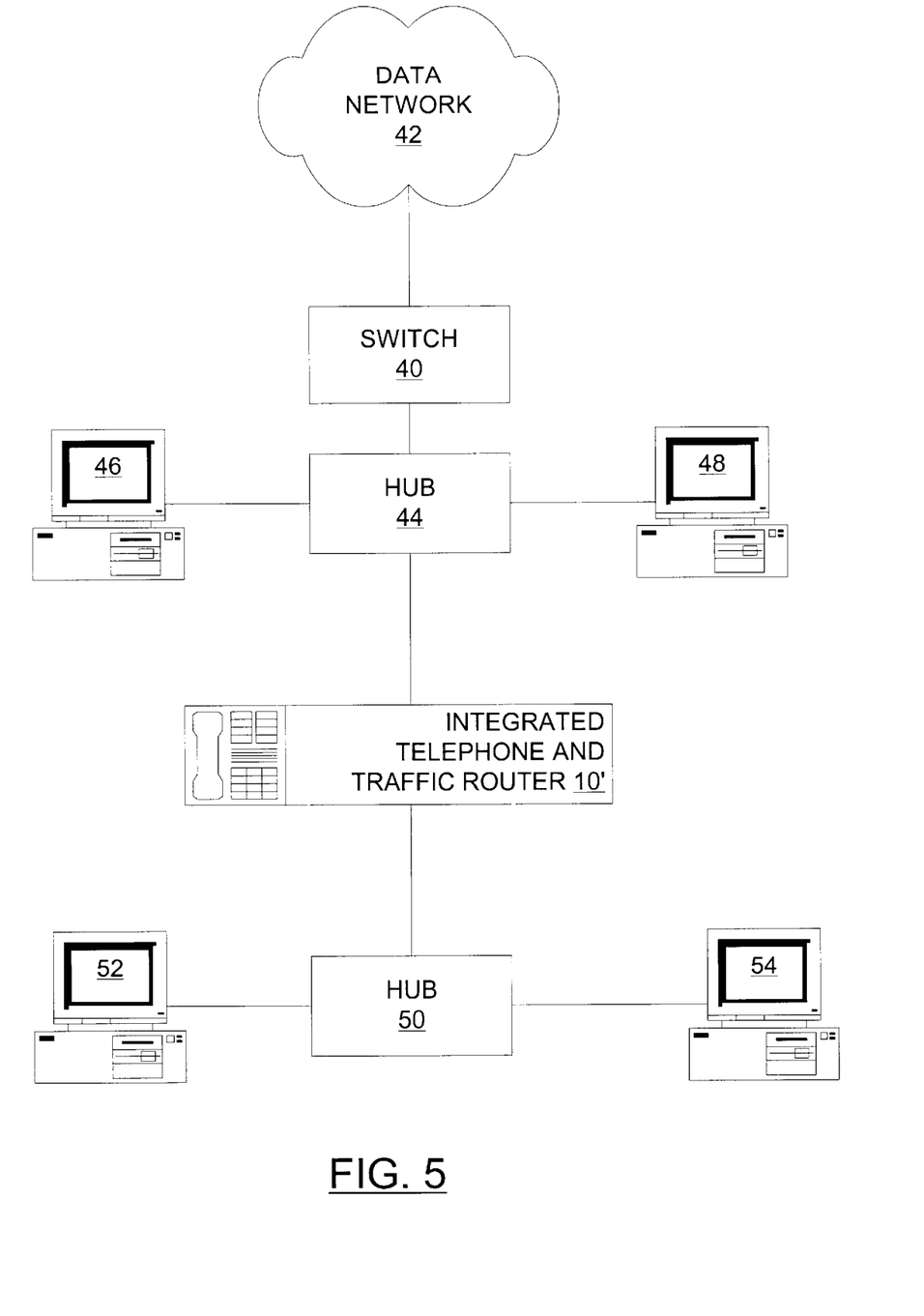
FIG. 5 illustrates a further network including the network interface of FIG. 1 in its second configuration.

The configuration of interface 10' also lends itself to use in association with a network as configured in FIG. 5. Here, a switch 40 isolates interface 10' from network 42. However, hub 44 further interconnects computing devices 46 and 48 upstream of interface 10'. Similarly, hub 50 connects devices 52 and 54 to low priority port 14 of interface 10'. As physical carriers emanating from ports 12a and 12b are shared through use of hubs 44 and 50, these ports should be configured to operate half-duplex. As will be appreciated, interface 10' now allows high priority port 12c and the integrated Ethernet phone to be configured in full duplex mode.

Again operation is as described above. Buffering and flow control minimizes the adverse affects of ports traffic at ports 12a and 12b on the high priority device interconnected with port 12c.

As will be appreciated any time one of ports 12 is configured to operate in half duplex, 10 (or 10') (FIGS. 2 and 3) an associated port may be used with a single physical carrier network, by using, for example, coaxial cables and connectors, replacing connectors 18, and otherwise modifying ports 12 appropriately.

As will further be appreciated, while the above described embodiments have been described with three physical ports 12, separate ports 12a, 12b and 12c could be logical ports on interface 10 or 10'. As such, interface 10 or 10' could pass frames associated with destination addresses corresponding to low and high priority devices at a single physical port. Low and high priority devices may be physically connected to this single physical port. Interface 10 may distinguish low priority frames from high priority frames based on their content. Additionally, and alternatively, in any of the above configurations, the nature of frames arriving at port 12 may be analysed at interface 10'. This may, for example, be done by processing element 30 examining the contents of received frames to determine the nature of contained data. For example, frames may be marked as high priority frames, in accordance with the IEEE 802.1 p standard; or a higher level protocol such as the Internet Engineering Task Force ("IETF") Real-Time Protocol ("RTP"); or similar information may be located within the frames. Frames within either transmit or receive queue may be transmitted based on their content so that higher priority frames may be moved to the beginning of either transmit or receive queue.

Similarly, the above embodiments have been described with reference to Ethernet compliant networks, and 10baset/100baseT connectors. However, the interface 10 (or 10') may easily be adapted to function with other carrier sense/collision detect multiple access networks. For example the interface may be adapted to function with a higher speed Ethernet such as a gigabit Ethernet. Alternatively, the interface could be adapted to function with an optical or other shared access network. As should now also be appreciated, Ethernet processors 24, 26 and 28 may be formed by modifying the design of existing Ethernet processors to allow for the interruption of the Ethernet binary exponential back-off.

As should now also be appreciated, receive buffers 18 could be eliminated entirely from the above embodiments. Received frames at ports 12a, 12b and 12c could be passed by processor 30 to transmit buffers 20a, 20b and 20c immediately upon receipt, and ordered as required. The amount of data within each transmit buffer 20a, 20b and 20c from respective ports 12a, 12b and 12c could be used to govern the flow control of data into interface 10.

Moreover, overall performance of interface 10 may be enhanced if frames are transmitted immediately upon receipt, if possible. Thus, interface 10 could be modified to allow transmission at an available transmit port, before a complete frame has been received. To enable use of the described modified CSMA/CD priority retry mechanism, and broadcasts at differing ports at differing times, the frame may still be buffered within memory 30 throughout its transmission at any port. Once a transmission is successfully completed at all ports the buffered frame may be purged. If the transmission encounters a collision, re-transmission may be retried as described above.

Finally, while interface 10 has been described with three ports, the invention could easily be adapted to a multi-port device having four or more ports. Such a multi-port device could assign relative priorities to various ports.

The above described embodiments, are intended to be illustrative only and in no way limiting. The described embodiments of carrying out the invention, are susceptible to many modifications of form, arrangement of parts, and details of operation. The invention, rather, is intended to encompass all such modification within its scope, as defined by the claims.

What is claimed, is:

1. A network interface comprising:
    a high priority port for interconnecting said interface to a high priority network appliance;
    a lower priority port for interconnecting said interface to a lower priority network appliance;
    a network port for connecting said interface to a data network;
    a buffer in communication with said high priority port, said low priority port and said network port, to buffer frames from said high priority port until said frames are transmitted;
    said interface operable to receive frames at said high priority port and said lower priority port and to transmit frames from said high priority port at said network port in advance of frames from said lower priority port, and wherein any buffered frames from said high priority port for said network port, pre-empt re-transmission of frames from said lower priority port at said network port.

2. The network interface of claim 1, wherein frames from said low priority port are buffered in said buffer, prior to being transmitted at said network port.

3. The network interface of claim 2, wherein frames received from said data network at said network port are transmitted at both said high priority port and said lower priority port.

4. The network interface of claim 3, where said high, lower and network ports each comprise an Ethernet port.

5. The network interface of claim 4, wherein said network port and said higher priority port are configured to operate full duplex.

6. The network interface of claim 4, wherein at least one port of said network port and said lower priority port is configured to operate half-duplex using carrier sense, multiple access, collision detect.

7. The network interface of claim 6, wherein in the event of a collision between a transmitted frame and an incoming frame at said at least one port, said at least one port transmits any buffered frames from said high-priority port to be transmitted in advance of re-transmitting frames not originating with said high-priority port.

8. The network interface of claim 1, wherein a frame to be broadcast from said high priority port at said low priority port and said network port may be transmitted from said buffer at differing times at said network priority port and said lower priority port.

9. The network interface of claim 1, wherein frames buffered at said buffer from said high priority port and older than a threshold age are discarded to make room for newer frames from said high priority port.

10. The network interface of claim 1, wherein said buffer comprises a receive buffer associated with each of said lower priority port used to buffer frames prior to transmitting frames, wherein said interface limits flow from each of said lower priority port, said high priority port and said network port, respectively when an associated receive buffer contains more than a threshold number of frames.

11. The network interface of claim 1, wherein said high priority port and said lower priority port comprise physical ports on said interface.

12. The network interface of claim 1, wherein said high priority port and said low priority port comprise logical ports on said interface.

13. The network interface of claim 1, further comprising an Ethernet phone associated with said high priority port.

14. A network interface comprising:
first, second and third network ports;
a controller in communication with said first, second and third ports;
buffer memory in communication with said controller;
said controller adapted to transfer frames between said first, second and third ports by way of said buffer memory, said controller adapted to order transmission of frames at said first, second and third ports so that any frames from said first port to be transmitted at both said second and said third port, may be transmitted at different times at said second and third port.

15. A network interface comprising:
first, second and third network ports;
a controller in communication with said first, second and third ports;
buffer memory in communication with said controller;
said controller adapted to receive frames from said first, second and third ports and buffer said frames within said buffer memory, until said frames are transmitted from said interface;
prioritize frames received at said interface so that frames received at said first port are transmitted in advance of frames received at said second and third port, at at least one of said second and third ports; and
to limit flow from each of said first, second, and third ports, independently, in response to the number of frames already buffered at said interface from said first, second and third ports.

16. The interface of claim 15, wherein said first port comprises an Ethernet port, operating half-duplex and flow from said first port is limited by generating a carrier sensed by a device interconnected with said first port.

17. The interface of claim 16, wherein said second port comprises an Ethernet port, operating in full duplex, and flow is limited using an Ethernet pause flow control command.

18. A method of transmitting high priority frames and lower priority frames from a network port at an interface using carrier sense multiple access, collision detect ("CSMA/CD") to transmit said frames, said method comprising:
transmitting lower priority and higher priority frames from said port using CSMA/CD with high priority frames transmitted in advance of lower priority frames;
in the presence of a detected collision at said port pre-empting re-transmission of a lower priority frame in favour of any high priority frames to be transmitted from said interface.

19. A network interface comprising:
a high priority port for connection to a network appliance;
at least one other port;
a controller in communication with said high priority port and said at least one other port;
buffer memory in communication with said controller;
said controller adapted to receive frames from said high priority port, buffer said received frames within said buffer memory, and transmit said received frames at another port of said interface, wherein each of said received frames is buffered until no longer required at said interface, and wherein incoming frames from said high priority port may be buffered to replace older received frames from said high priority port so that older frames are discarded in advance of newer frames at said interface, in the event of a buffer overflow.

* * * * *